(12) United States Patent
Schorzman et al.

(10) Patent No.: US 6,358,395 B1
(45) Date of Patent: Mar. 19, 2002

(54) UNDER THE COUNTER WATER TREATMENT SYSTEM

(75) Inventors: Scott A. Schorzman, Brier, WA (US);
John J. Orolin, West Linn, OR (US);
Troy T. Johnson, Seattle, WA (US);
Vaughn A. Sucevich, Sr., Milwaukie, OR (US)

(73) Assignee: H20 Technologies Ltd., Milwaukie, OR (US)

( * ) Notice: Subject to any disclaimer, the term of this patent is extended or adjusted under 35 U.S.C. 154(b) by 0 days.

(21) Appl. No.: 09/637,955

(22) Filed: Aug. 11, 2000

(51) Int. Cl.$^7$ ................................................ C02F 1/461
(52) U.S. Cl. ...................... 205/701; 205/742; 205/747; 204/228.3; 204/242; 204/275.1; 204/276
(58) Field of Search ................................ 205/701, 742, 205/747; 204/228.3, 242, 275.1, 276

(56) References Cited

U.S. PATENT DOCUMENTS

| | | | |
|---|---|---|---|
| 1,217,643 A | 2/1917 | Schneider | 204/271 |
| 1,862,663 A | 6/1932 | Curtis | |
| 2,468,357 A | 4/1949 | Brown | 204/248 |
| 2,864,750 A | 12/1958 | Hughes, Jr. et al. | 204/149 |
| 3,095,365 A | 6/1963 | Green | 204/229 |
| 3,523,891 A | 8/1970 | Mehl | 210/44 |
| 3,654,119 A | 4/1972 | White et al. | 204/228 |
| 3,728,245 A | 4/1973 | Preis et al. | 204/275 |
| 3,819,504 A | 6/1974 | Bennett | 204/289 |
| 3,865,710 A | 2/1975 | Phipps | 204/228 |
| 3,925,176 A | 12/1975 | Okert | 204/152 |
| 3,943,044 A | 3/1976 | Fenn, III et al. | 204/149 |
| 4,017,375 A | 4/1977 | Pohto | 204/255 |
| 4,061,556 A | 12/1977 | Reis et al. | 204/271 |
| 4,107,021 A | 8/1978 | Okazaki | 204/263 |
| 4,119,517 A | 10/1978 | Hengst | 204/229 |
| 4,119,520 A | 10/1978 | Paschakarnis et al. | 204/276 |
| 4,132,620 A | 1/1979 | Nidola et al. | 204/242 |
| 4,160,716 A | 7/1979 | Wiseman | 204/270 |
| 4,180,445 A | 12/1979 | Bennett et al. | 204/129 |
| 4,312,736 A | 1/1982 | Menth et al. | 204/255 |
| 4,385,973 A | 5/1983 | Reis et al. | 204/149 |
| 4,419,206 A | 12/1983 | Frame | 204/228 |

(List continued on next page.)

FOREIGN PATENT DOCUMENTS

| | | |
|---|---|---|
| FR | 2150168 | 3/1973 |
| GB | 105641 | 5/1917 |
| WO | WO 87/01690 | 3/1987 |
| WO | WO 95/21795 | 8/1995 |
| WO | WO 98/04502 | 2/1998 |
| WO | WO 99/24369 | 5/1999 |

OTHER PUBLICATIONS

The Advanced Water Systems Incorporated, "The Water Technologies", company brochure regarding information on various products to improve water quality, different types of water systems and current technology, Sep. 30, 1993.

*Primary Examiner*—Arun Phasge
(74) *Attorney, Agent, or Firm*—Seed Intellectual Property Law Group PLLC

(57) ABSTRACT

An under the counter water treatment system to treat water from an outside supply source, is provided. A prefilter to remove sediment, organic compounds, and certain pollutants is first provided. Then the water enters a reverse osmosis system including reverse osmotic membrane which filters out impurities and very small particles providing highly purified water, and is stored in a water tank. When the water exits the tank, it passes through an electrolytic cell having a plurality of plates. This electrolytic treatment creates oxygen in the water, inserts free electrons into the water, and improves the taste and affinity of the water for accepting other minerals. After passing out of the electrolytic cell, the water may pass through a final treatment stage after which it is provided at an outlet tap for consumption by an end user.

18 Claims, 6 Drawing Sheets

U.S. PATENT DOCUMENTS

| | | |
|---|---|---|
| 4,425,216 A | 1/1984 | Neymeyer .................. 204/270 |
| 4,436,601 A | 3/1984 | Branchick et al. .......... 204/149 |
| 4,451,341 A | 5/1984 | Miller ........................ 204/149 |
| 4,481,096 A | 11/1984 | Okazaki ..................... 204/265 |
| 4,528,083 A | 7/1985 | LaConti et al. ............. 204/265 |
| 4,572,775 A | 2/1986 | Paniagua .................... 204/229 |
| 4,623,436 A | 11/1986 | Umehara ..................... 204/149 |
| 4,639,303 A | 1/1987 | Staab et al. .................. 204/258 |
| 4,761,208 A | 8/1988 | Gram et al. .................. 204/95 |
| 4,781,805 A | 11/1988 | Dahlgren .................... 204/149 |
| 4,783,246 A | 11/1988 | Langeland et al. ........... 204/95 |
| 4,784,735 A | 11/1988 | Sorenson ..................... 204/98 |
| 4,790,914 A | 12/1988 | Sorenson ..................... 204/98 |
| 4,797,182 A | 1/1989 | Beer et al. .................. 204/14.1 |
| 4,839,007 A | 6/1989 | Kötz et al. .................. 204/149 |
| 4,917,782 A | 4/1990 | Davies ....................... 204/152 |
| 4,936,979 A | 6/1990 | Brown ........................ 210/85 |
| 5,062,940 A | 11/1991 | Davies ....................... 204/228 |
| 5,100,502 A | 3/1992 | Murdoch et al. ............ 156/643 |
| 5,292,412 A | 3/1994 | Pitton ........................ 204/149 |
| 5,324,398 A | 6/1994 | Erickson et al. ............ 204/149 |
| 5,324,434 A * | 6/1994 | Oikawa et al. ............. 205/701 |
| 5,328,584 A | 7/1994 | Erickson et al. ............ 204/229 |
| 5,389,214 A | 2/1995 | Erickson et al. ............ 204/149 |
| 5,427,667 A | 6/1995 | Bakhir et al. ............... 204/260 |
| 5,460,702 A | 10/1995 | Birkbeck et al. ........... 204/149 |
| 5,728,287 A | 3/1998 | Hough et al. ............... 205/743 |
| 5,759,384 A | 6/1998 | Silveri ....................... 205/743 |
| 5,876,575 A | 3/1999 | Kump ........................ 204/197 |
| 5,911,870 A | 6/1999 | Hough ....................... 205/701 |
| 5,928,503 A | 7/1999 | Shang-Chun ............... 210/86 |
| 5,944,978 A * | 8/1999 | Okazaki ..................... 205/701 |

* cited by examiner

UNDER THE COUNTER WATER TREATMENT SYSTEM

TECHNICAL FIELD

The present invention relates to an electrolytic filter for use in a home, and in particular, to an under the counter system having electrolytic plates for water treatment.

BACKGROUND OF THE INVENTION

Electrolytic cells are currently being used in commercial environments to provide oxygenized water for drinking. U.S. Pat. No. 5,911,870 describes a system in which water passes between plates having an electric current between them. The electric current travels through the water, breaking the water molecule into its constituent gasses, hydrogen and oxygen. Much of the oxygen is dissolved in the water after which it is delivered to a tap for drinking water.

SUMMARY OF THE INVENTION

According to principles of the present invention, an electrolytic converter is provided within an overall water treatment system that is placed under the counter for use in a home environment. Water from an outside supply source, such as municipal water line, well or the like, enters the under the counter treatment system. The water passes through a series of pre-filters which can be designed to remove sediment, residual chlorine large particles, or in some instances volatile organic compounds which may exist in the water supply. After the pre-filters, the water enters a reverse osmosis system which includes an osmosis membrane. The reverse osmosis membrane filters out impurities and very small particles to provide highly purified water. The outflow of the reverse osmosis system is stored in a water tank. The water tank preferably stores the water under pressure so that it can be released upon opening the appropriate valve. When the water exits the tank, it passes through an electrolytic cell having a plurality of plates. Current passes between the plates, and thus passes through the water flowing between the plates. This has several affects on the water including, creating oxygen gas which is dissolved in the water, inserting free electrons into the water as well as improving the taste and affinity of the water for excepting other minerals. After passing out of the electrolytic cell, the water passes through a final treatment stage after which it is provided to an outlet tap at a sink for consumption by an end user.

A switch at the tap provides a dual function, first, it opens a valve to release water from the water tank to flow out of the tap. In addition to being a mechanical switch which opens the valve, it also is an electrical switch which sends a signal to an electronic control system. The electronic controls cause the flow of electric current through the plates to begin when water begins to be withdrawn from the tank. Thus, simultaneously with the start of the flow of water, electric current flows through the cell to treat the water. The current flow continues for a selected period of time, even if the water flow stops during this time period. Thus, the water currently in the cell is treated while it is passing through the cell and also, the water which remains in the cell after the flow is terminated is also treated.

If the water flow continues beyond the selected period of time, then the electronic control switches mode such that the switch acts as an electrical on/off switch for power provided to the electrolytic cell. In the second mode of operation, when the switch is closed to stop the flow of water, this also causes the current provided to the cell to terminate. If the switch remains on for an extended period of time, then the electronic controls cause the power to be terminated to the electrolytic cell. A system is therefor provided by which treatment occurs according to a first mode during the start of water flow, switches to a second mode if water flow continues beyond a selected period of time, and switches to a third mode if the activation switch remains enabled for an extended period of time.

DETAILED DESCRIPTION OF THE INVENTION

Figure 1:
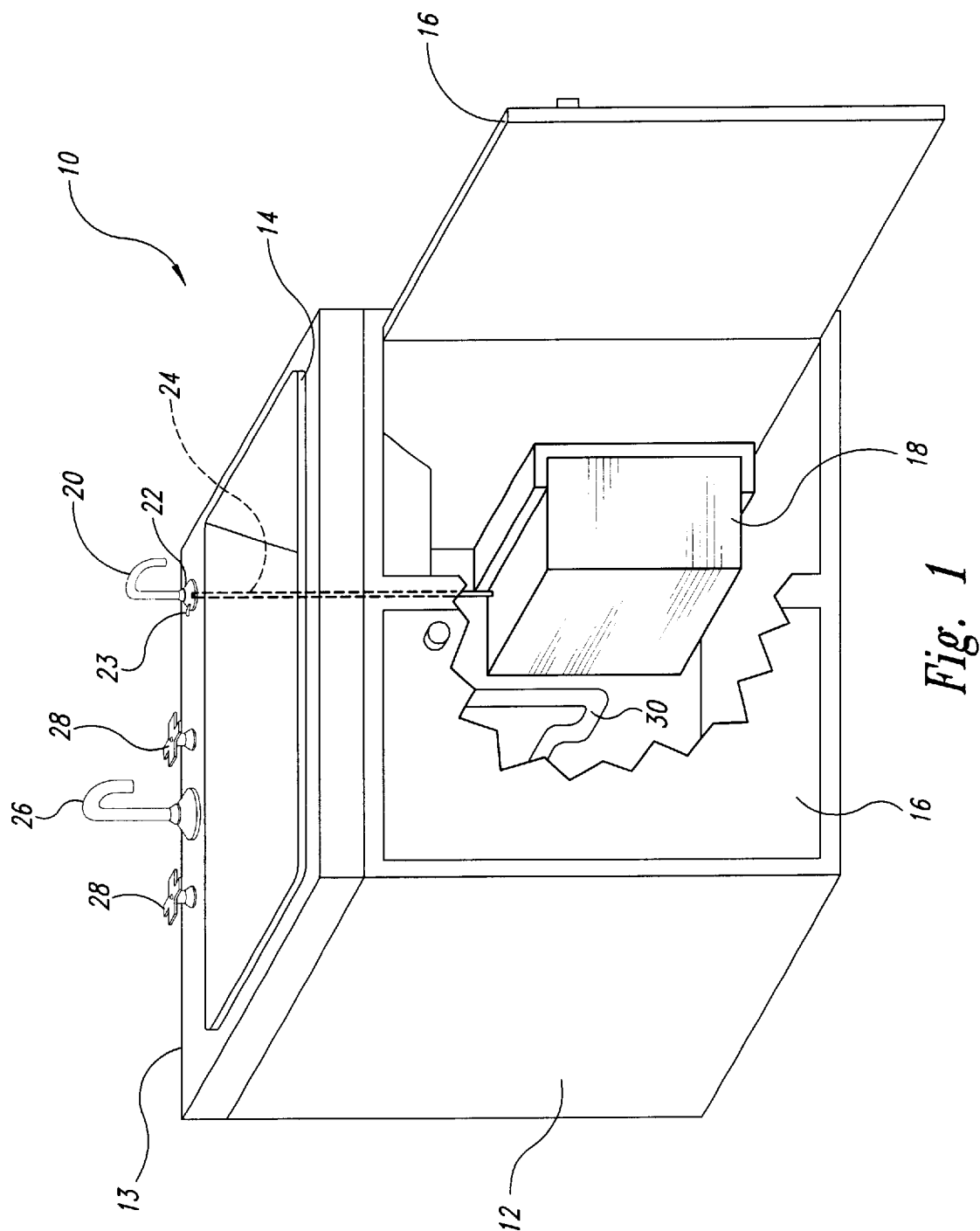
FIG. 1 is an isometric view of the present invention as used under the counter.

FIG. 1 shows a counter unit 10 which includes the filter system of the present invention. The system 10 includes a cabinet housing 12 having a counter 13 on the top thereof and a sink 14 in the counter. Doors 16 provide access to the interior of the cabinet 12. A water treatment system 18 is connected under the counter 13, below sink 14, so as to provide water to a user from under the counter. At the top of the counter 13 is a clean water tap 20 having a support housing 22 and an actuator switch 23. The tap 20 is of the type style commonly available today which provides specialized delivery of water, such as hot water or filtered water to a sink 14. A pipeline 24 extends from the tap 20 to the water filtration system 18.

Also provided at the sink 14 is the standard faucet 26, with valve controls 28 to provide water from the standard water supply to the sink 14. Piping 30 provides connection from the sink to the drain.

Figure 2A:
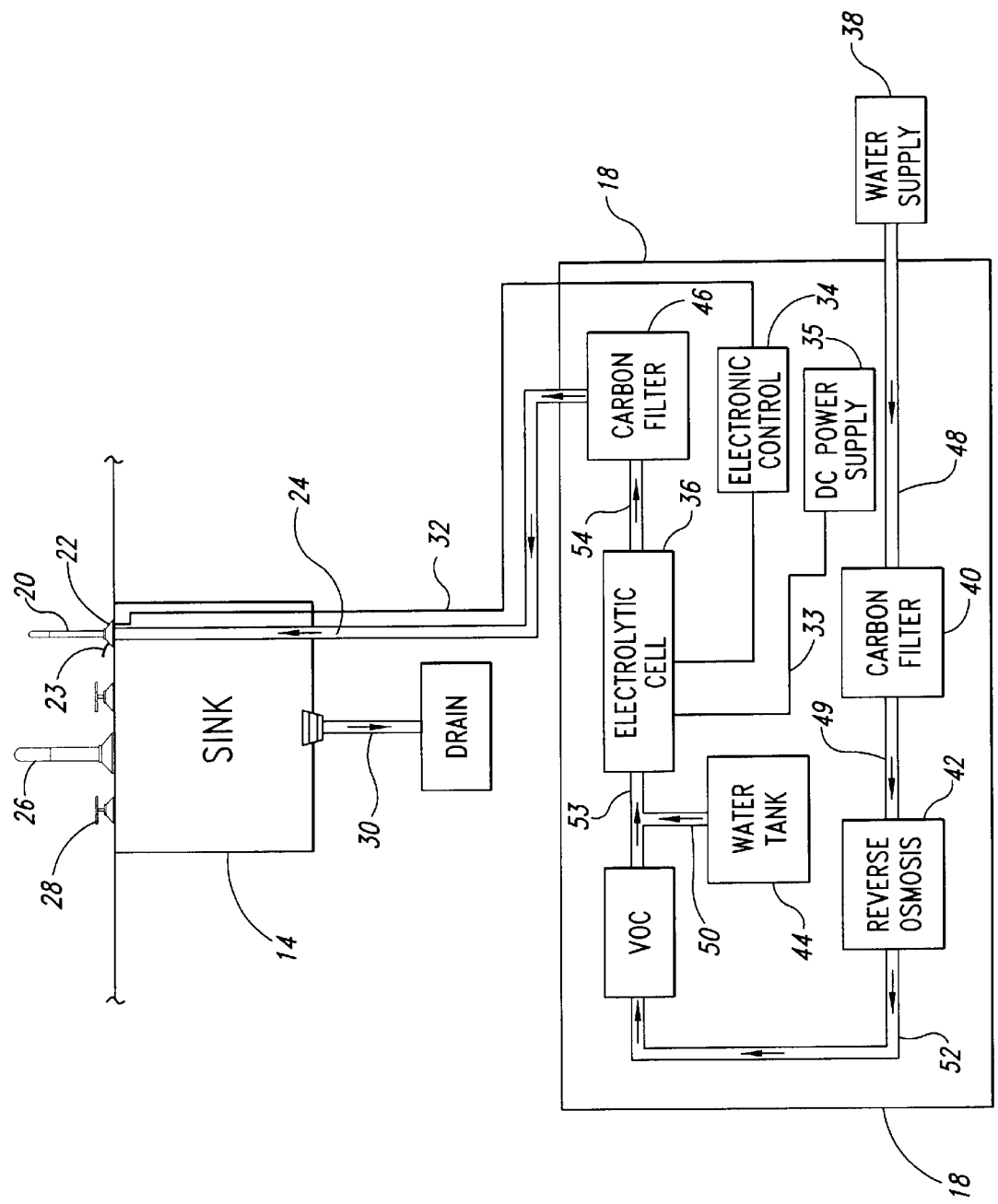
FIG. 2A is a schematic view showing in block diagram form the different elements of the present invention.

FIG. 2A is a block diagram showing schematically the features of the present invention. The sink 14 includes two water supply taps, a standard faucet 26 controlled by valves 28 and a treated water tap 20 which provides the treated water.

A water supply 38 provides the source of water, under the appropriate pressure to promote flow to the water treatment system 18. The water flows into a pipe 48 to a first filter 40, in this instance a carbon filter. Water exits the carbon filter 40 via outlet pipe 49 and enters a reverse osmosis filter 42. After water exits the reverse osmosis filter 42, it travels through pipe 52 to a VOC filter, which refers to a volatile organic compound filter. A VOC filter is the type of filter which removes volatile organic compounds as may be present in the water in the form of gasoline molecules, oils, organic residues from the water supply or other organic compounds which may be present in the water. According to one embodiment, the VOC filter is positioned after the reverse osmosis filter 42. According to a second embodiment, the VOC filter is positioned after the carbon filter 40 but prior to the reverse osmosis filter. The VOC filter therefore removes all the hydrocarbons, organic compounds and other pollutants prior to the water entering the reverse osmosis filter.

Reverse osmosis filters are known generally in the prior art as a single component within an isolated water treatment system. The structure and operation of reverse osmosis filters are well known in the art and therefore need not be described in detail. A brief summary is sufficient as follows. In reverse osmosis filters, an osmotic membrane is provided through which water molecules pass by osmosis. The membrane may be under pressure in some embodiments. The membrane is composed of very small apertures which permits water to pass therethrough. However, it blocks the passing of many molecules larger than water. A majority of bacteria, iron, minerals, heavy metals, and other pollutants in the water are filtered and removed by the reverse osmosis membrane. A reverse osmosis membrane therefore results in highly purified water. Because a reverse osmosis membrane filters a highly purified water, it often does not operate as quickly as a user desires water. Indeed, in some systems the output from a reverse osmosis filter is quite slow, and may be in the form of a series of drips or very slow flow, depending on the type of filter used, its configuration, and the desired output. It is also known that flush water may also be provided to clean the membrane to remove the contaminants from the membrane which have been removed from the water and flush them to a drain so that the reverse osmosis filter may continue clean operation over an extended period of time. As can be appreciated, there are various tradeoffs with respect to cost, throughput speed, and the purification of the water in such a filter system.

The water output from the reverse osmosis filter 42 is provided to a water tank 44 via output line 53. The water tank 44 is provided for those embodiments in which the output flow from the reverse osmosis filter is a low flow rate and it is therefore desired to store a quantity of highly purified water for immediate use. The water tank 44 will normally have a size and a range of 1–3 gallons, and preferable is 1 ½–2 gallons in size. The water tank 44 stores the highly purified water in clean condition so that it remains purified while awaiting use by the consumer.

An actuator valve 23 is provided near the tap 20 so that the user may withdraw water from the water tank 44. The actuator switch 23 is a two-function switch, first as a valve control to open the valve for water flow, and second as an electrical actuator to provide an electrical signal to the electronic controls 34. This is accomplished by placing an electrical sensor underneath the actuator 23 so that depressing the actuator switch 23 serves to both open the valve and activate the electrical switch.

When water is drawn from the tap 20 by depressing the actuator switch 23, it passes through an electrolytic cell 36. The electrolytic cell 36 has DC power from supply 35 provided thereto by electronic controls 34 so that an electric current passes through the water as it moves through the electrolytic cell 36. The water exits the electrolytic cell 36 via tubing 54 and passes through a second carbon filter 46. After passing through the carbon filter 46, it enters tubing 24 which supplies the highly purified, treated water out tap 20.

FIG. 2A is a block diagram of the schematic concept of the present invention. As can be seen, the water is shown as passing from one filter system to the next until it is eventually provided via tap 20 for the end consumer. A number of pipes, angles, and direction changes in water flow in the piping are shown in FIG. 2A. As will be appreciated, these are schematic in nature and the actual tubing considerations will depend on each particular application. For example, according to one embodiment, the carbon filter 46 is positioned directly below the tap 20 so there is no bend in the tubing from the exit of carbon filter 46 to the tap 20, and instead, there is a bend in the tubing 54 between the electrolytic cell 36 and the filter 46 so as to properly position the electrolytic cell 36 within the housing for the treatment system 18. Similarly, there may be a bend in the system between the first filter 40 and the reverse osmosis system 42 and not have any bend in the system between the reverse osmosis filter 42 and the tank 44. Additionally, water from the water supply 38 may pass through a sediment filter prior to the carbon filter 40, allowing for two pretreatment stages. Thus, the exact configuration of the tubing, and the specific location of the various filters with respect to each other may be modified based on the shape of the housing, the available space under the counter, the location of the water supply, and other particular features of each application, all such applications being equivalent to each within the concept of the present invention.

Figure 2B:
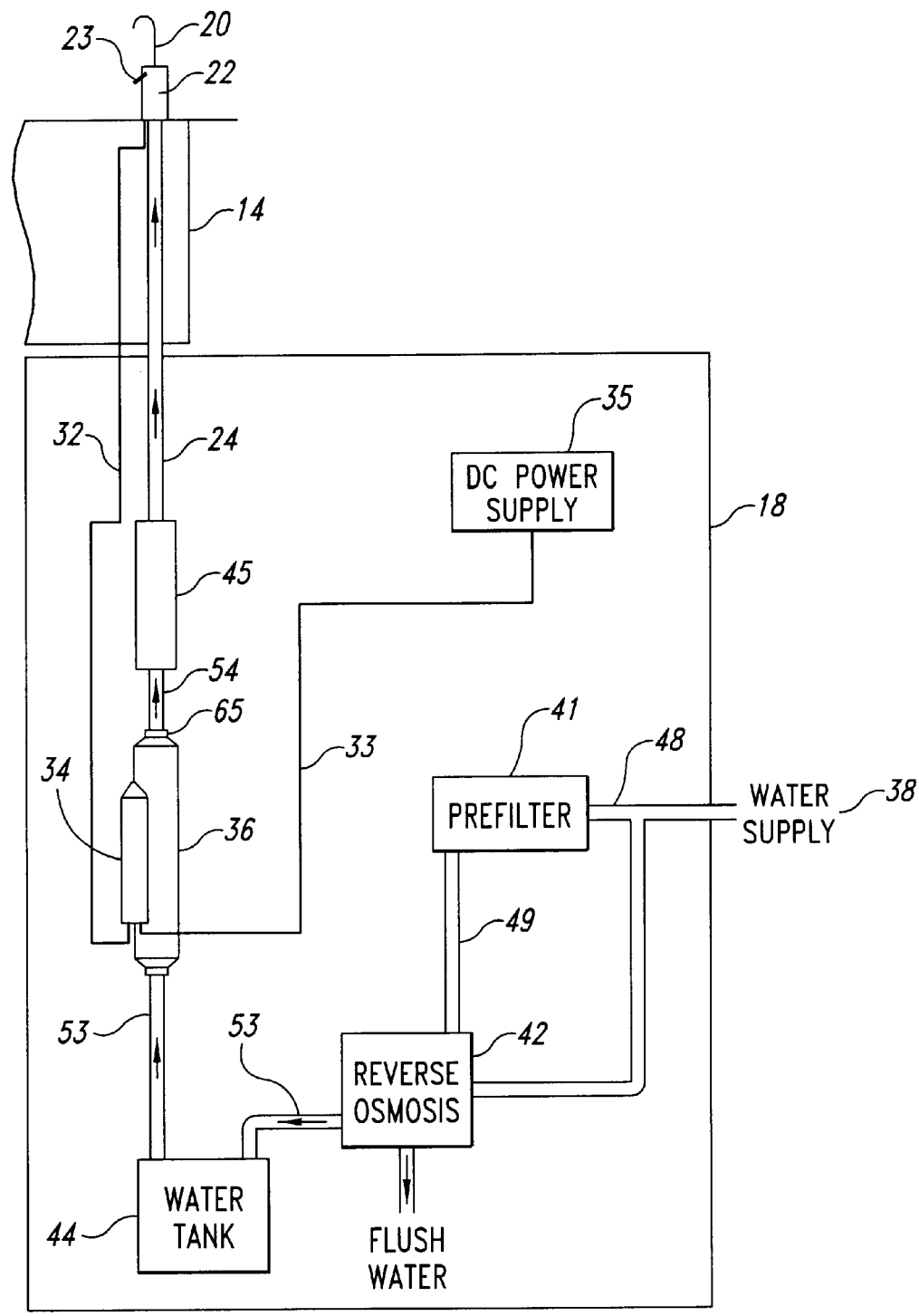
FIG. 2B is a side view of one embodiment of the present invention of the under the counter unit.

FIG. 2B illustrates one of the possible specific applications according to principles of the present invention. A water supply 38 provides water into the system 18 via a line 48. The water first passes through a prefilter 41 which removes sediment, organic compounds, and other pollutants. In one embodiment, the prefilter 41 is a stage filter of a sediment filter, followed by a volatile organic compound filter (VOC). Alternatively, it may include a carbon filter, a carbon filter in combination with a sediment filter, or other appropriate filters to clean the water prior to entering the reverse osmosis filter 42. The filter water enters the reverse osmosis filter 42 via tubing 49. As water is filtered, it passes through tubing 53 into the water tank 44. As is common with many reverse osmosis filters, two water supplies are provided, first the water which is to be filtered in line 49, and second, a flush water via line 48 which is used to maintain the membrane in a clean operational condition but which is not part of the outlet water. For those reverse osmosis filters 42 which require a flush water, this is provided via piping 48 through the prefilter 41 or via bypass piping around the prefilter 41. The flush water exits via flush water outlet of the reverse osmosis filter 42.

Water passing out of the osmotic membrane enters water tank 42 via pipe 53. The rate at which water passes into the tank 44 via tubing 53 is based on the cleaning rate of the reverse osmosis system 42 and, as previously noted herein, may be a small stream, or even a drip flow rate. The water is accumulated in tank 44 waiting for use.

Upon depressing actuator 23, a valve is opened and water passes out of tank 44 via tubing 53 into the electrolytic cell 36. The electronic controls 34 have a switch connected to the actuator switch 23 which provides a signal to the electronic controls 34. Thus, simultaneously with the valve to tap 20 being opened, an electric current is provided on line 33 from DC power supply 35 to pass between the plates to treat the water in the electrolytic cell 36. After the water passes out the electrolytic cell 36, it is provided via line 24 to outlet tap 20. According to one alternative embodiment, a post filter 45 may be provided after the electrolytic cell 36. This post filter 45 may be mineral deposition filter that places a carefully measured amount of selected minerals into the water. However, in one embodiment, such a post filter 45 is not provided and the water is fed directly from the electrolytic cell 36 to the tap 20.

Tank 44 is constructed of any acceptable design for providing water out of outlet 20 when the valve is opened via actuator switch 23. Normally, the pipe 53 will not be under pressure because of the slow stream of water.

Accordingly, another source of pressure is provided to assist water in exiting the tank 44. According to one known technique, an air pressure source is provided to maintain the water in tank 44 under a pressurized system preparing for exit to the tap 20. A membrane is provided to separate the water from the pressurized air. Upon the valve being opened, the pressurized air forces the water out of tank 44 at a selected rate. Alternatively, another source of pressure may be provided, such as a small pump, a connection to pressurized water supply which maintains separation between the highly purified water and the pressure water source, or any other acceptable technique. Since the water in the tank is highly purified water, it is desirable to maintain it separate from all other water or other sources of contamination until it is provided out of tap 20 to the user.

Figure 3:
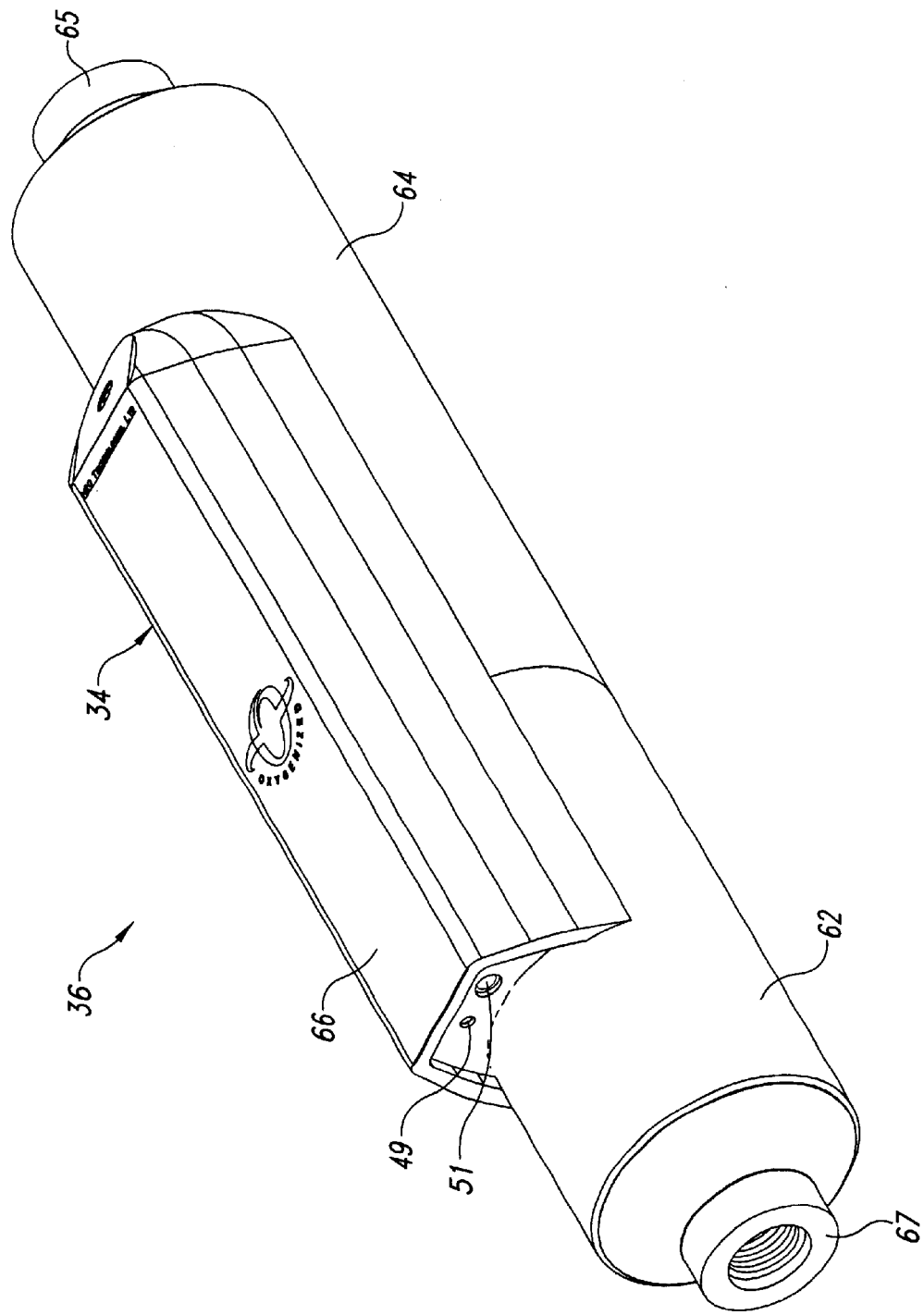
FIG. 3 is an isometric view of the electrolytic cell according to the present invention, with electronic controls attached thereto.

FIG. 3 illustrates the electrolytic cell 36 and the electronic controls 34 attached thereto. The electrolytic cell 36 includes an inlet 67 and an outlet 65. A first housing member 62 is coupled to a second housing member 64. The electronic controls 34 include a housing 66 having apertures 49 and 51 at one end thereof. The wire 32 from actuator switch 23 is provided via opening 49 to activate the power to the electrolytic cell. A DC power supply 35 provides a DC power via wire 33 in the other opening.

The DC power supply 35 may be any acceptable source of direct current power. For example, it may plug into the wall and include an AC to DC converter which converts an AC line current to a DC supply of a known voltage and current capability. Alternatively, it may be a battery, a stand-alone power supply such as a desktop power supply, a DC power line, or any other DC source. The DC power supply 35 may be affixed to the housing of the system 18 or the tank 44.

Figure 4:
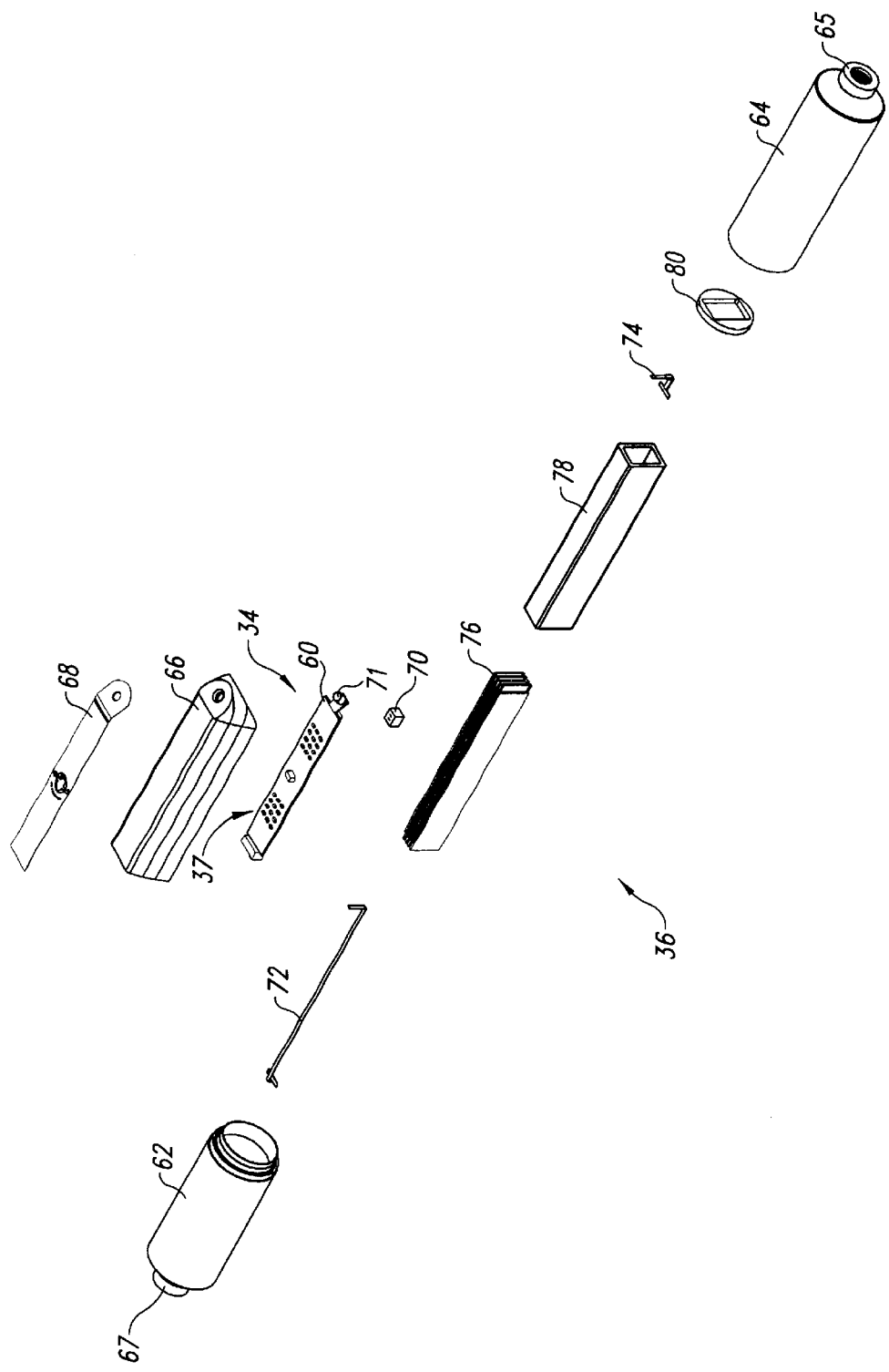
FIG. 4 is an exploded view of the cell of FIG. 3.
Figure 5:
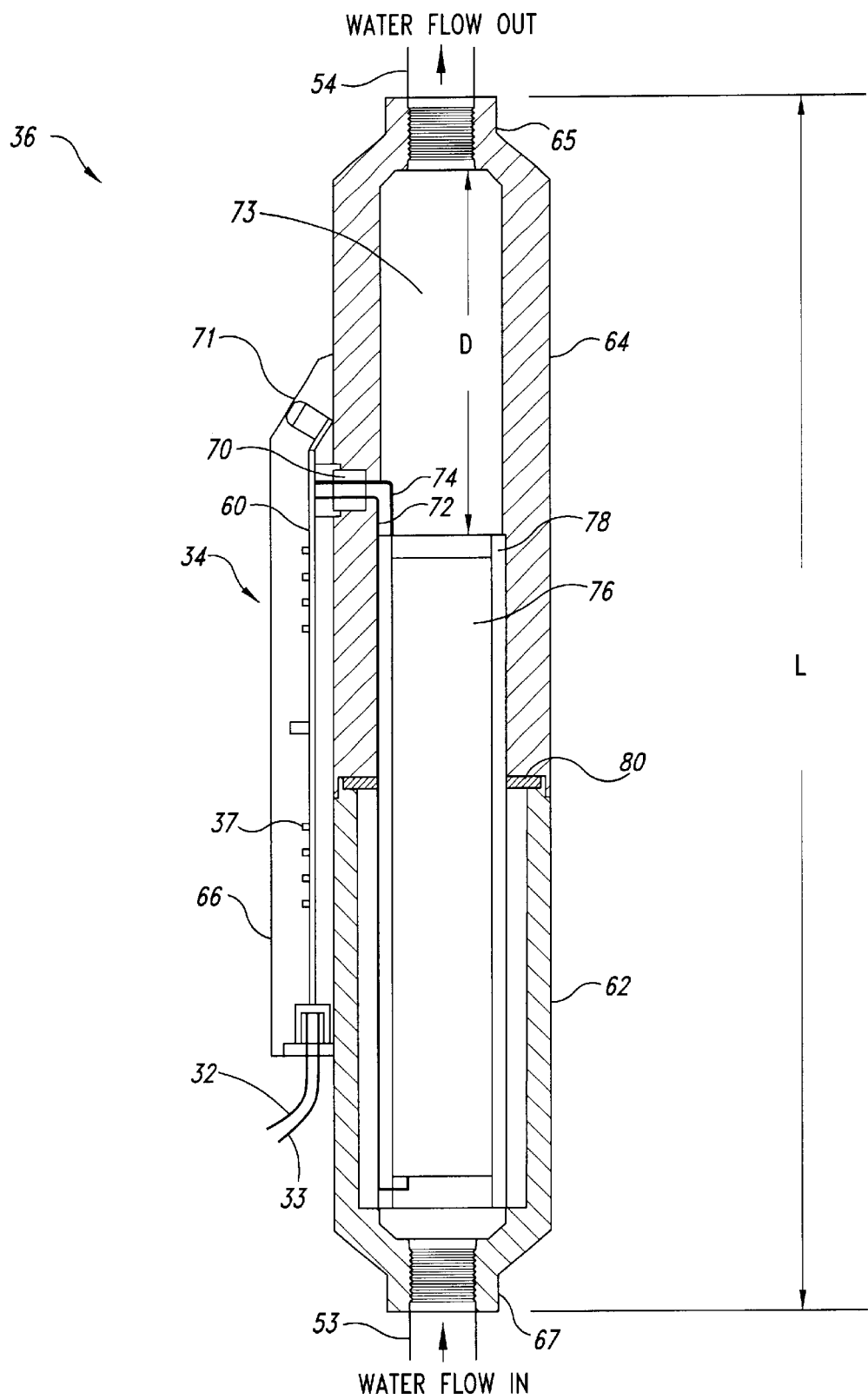
FIG. 5 is a partial cross-sectional view of the electrolytic cell and electronic controls of FIG. 3.

FIG. 4 is an exploded view of the electrolytic cell of FIG. 3, and FIG. 5 is a partial cross-sectional view of the electrolytic cell of FIG. 3. As shown in FIGS. 4 and 5, the electrolytic cell includes plates 76. The plates 76 are made of an electrically conductive material of a type known and acceptable in the art. The plates 76 are held in a precise spaced relationship with respect to each other. When direct current voltage is placed on one or more of the plates, an electric current passes from one plate to an adjacent plate. As the electric current passes from one plate 76 to another plate 76, it passes through water positioned between the plates. A first electrode terminal 74 provides electrical contact from one terminal of the DC power supply to one-half of the plates. Another electrode terminal 72 provides power to the other DC terminal to the other half of the plates. Accordingly, the plates at the first voltage are interleaved with plates held at the second voltage, preferably a positive voltage and ground for the two respective voltages. According to one embodiment, the voltage may, for example, be fifteen volts, twenty-five volts or any acceptable DC value to provide a desired current flow as explained herein. In one embodiment, the voltage is preferably less than 50 volts and more preferably the voltage is 24 volts. The current may be in the range of 1 to 20 amps, and is preferred to be in the range of 1 to 5 amps. A plate housing 78 encloses the plates 76 to retain them in a spaced relationship and mechanically support them within the electrolytic cell 36. A water block 80 is positioned around the housing 78 and abuts against the interior wall of the two housing components 62 and 64 as can be seen in FIG. 5. This block 80 acts as a seal to ensure that all water passes through the electrolytic plates 76 and cannot bypass the housing 78.

The first housing member 62 is affixed to the second housing member 64 by any acceptable technique such as threading, adhesive, soldering, brazing, spin welding or other appropriate watertight seal. Preferably, a threaded connection is used so that the electrolytic cell can be disassembled by unthreading the member 62 from the member 64 and the plate 76 removed for inspection and service.

The electronic controls 34 directly affixed to the housing of the electrolytic cell 36. The electronic controls 34 include a circuit board 60 which includes a number of integrated circuits and components 37 for control of the electronic circuit as described herein. The wire 32 is connected to the circuit board 60 via the appropriate connections to indicate that the actuator switch 23 has been depressed. A DC power supply wire 33 is also coupled to the circuit board 60 and by appropriate switches to electrode 72 and 74 to power the plates 76. An insulation block 70 is provided to mechanically support the board 60 and provide electrical insulation for the electrode 72 and 74. Other appropriate mechanical support and insulation members are also provided to hold circuit board 60 connected to the electrolytic cell 36 and electrically insulated therefrom as could easily be constructed by those of skill in the art. The circuit board may also be coated with a waterproof barrier such as a coating to protect it from soaking. A cover 66 is provided to enclose the circuit board 60 and retain it on the electrolytic cell 36. An appropriate cover plate 68 may also be provided on the housing 66. A signal light 71 which is connected to circuits on circuit board 60 can be seen if illuminated through an opening in the housing 66. The signal light 71 may indicate that the electrolytic cell is currently operating correctly and power is being provided while water is being filtered. Further, the signal light 71 may include two or more lights, of different colors such as red and green, with one color indicating proper operation and the other color indicating that the cell should be checked to confirm that it is operating correctly.

According to a preferred embodiment, the electrolytic cell 36 is vertically oriented when water passes therethrough, as shown in FIGS. 2B and 5. In particular, water flows upwards, against the flow of gravity between plates 76 and exits the pipe 54 as shown in FIG. 2B. The cell has quick disconnect fittings at each end for ease of installation. One example is a push connect fitting. The vertical orientation of the electrolytic cell 36 provides a number of advantages. A dissolving chamber 73 is provided vertically above the plates 76. It has an overall length L of the appropriate size to fit under a counter. A size in the range of 10"–20" is acceptable with 14"–16" being preferred. The dissolving chamber 73 has a preset volume and a vertical distance D. In one embodiment, the distance D is in the range of 3–6 inches. The dissolving chamber 73 contains water in a quiet zone undergoing preferably laminar flow. Within this quiet zone, the dissolving chamber provides additional room for the oxygen gas to transition from the gaseous state to a dissolved state within the water. Further, by having the housing vertically oriented, the oxygen has the additional travel through pipe 54 and pipes 24 for the oxygen to transition from the gaseous state to the dissolved state so that a large amount of the generated oxygen is in the form of dissolved oxygen when it exits tap 20. Thus, having the entire system vertically oriented below tap 20 provides further advantages in providing extended length settling zone for the dissolved oxygen beyond that provided by the dissolving chamber 73.

Generally, the hydrogen gas is more difficult to dissolve in the water and a large percent of it will remain in the gaseous state. When water exits tap 20, the hydrogen which remains in the gaseous state will vent to the air and escape upward, whereas the water to be used by the customer, whether for tea, coffee, juice or some other use will have large amounts of dissolved oxygen therein. The use of the electrolytic cell 36 in combination with the reverse osmosis system provides particular advantages not previously obtainable in prior systems. The reverse osmosis system results in highly purified water. Nearly 100% of all non-water molecules are removed from the water including all bacteria, metals, giardia, staphylococcus, and other small pollutants not removed by normal filters. Because the water is highly purified as it exits from the reverse osmosis filter it may often have a flat taste to the consumer. The electrolytic cell 36 adds oxygen to the water, significantly improving the taste and freshness of the water.

In addition, in one embodiment a selective mineral addition filter 45 is provided. It is known that highly purified water may, in some instances be so tasteless as to not be pleasant to the person consuming the water. Further, if all minerals have been removed from the water it may, in some instances upon entering the body of the user attempt to draw nutrients and minerals from the user's body into the water. Thus, rather than being of assistance to the user it may actually serve to deplete some of the user's valuable salts, minerals and other necessary components. Accordingly, in one embodiment a controlled amount of selected minerals are provided to the water after it passes out of the electrolytic cell. The minerals added may include small amounts of calcium, iron and others. In addition, the water can be made more healthy by adding only exactly those minerals which are desired in the desired quantity such as small amounts of fluorine, small quantities of zinc, iron and other essential body nutrients. The appropriate vitamins can therefore be provided via the water with the appropriate final filter 45. The adding of minerals to highly purified water to make it more suitable for human consumption is known previously in the prior art, however it has not yet been used in a system having the combination of a reverse osmosis filter followed by an electrolytic cell of the present invention. Advantageously, according to the present invention the minerals and amount of mineral added can be exactly controlled so the users obtain the proper health benefits and flavor of the water.

The present invention also provides water having a low oxygen reduction potential. The oxygen reduction potential (ORP) is a measure of the number of free electrons in the water. Is normally measured in the millivolt and represents the affinity of the water for removing electrons from sources it comes in contact with. For example, normal tap water may have an ORP in the range of 300–600 millivolts or higher. With a high ORP, when it enters the body, electrons are withdrawn from the body to the water because there are a large number of free radicals in the water. The free radicals in the water serve as an oxidant and are considered to be detrimental to the health of an individual. The reverse osmosis filter 42 provides the advantages of significantly reducing the ORP of the water. Upon entering the reverse osmosis filter 42, water may have an ORP in the range of 600 millivolts. Upon exiting the reverse osmosis filter, it may be in the range of 100 or less since the reverse osmosis filter has removed a large number of minerals that produce free radicals from the water. The water is therefore more healthy in the respect that it does not have as many free radicals. When the water next passes through the electrolytic cell 36 after passing through the reverse osmosis filter, a large number of electrons are added to the water so that it obtains a negative ORP. For example, after exiting from the electrolytic cell 36, it may have an ORP of negative 100 millivolts to 200 millivolts. Thus, the water has no free radicals and instead, has additional electrolytes and may serve as an antioxidant to donate electrons if needed. The extra electrons in the water serve to absorb the free radicals that exist in the body so as to act as an antioxidant.

It has not previously been recognized that the combination of reverse osmosis filter followed by an electrolytic cell 36 provides the advantage of significantly reducing or removing altogether the free radicals and transitioning the water to have a negative ORP. The combination therefor, the reverse osmosis filter followed by the electrolytic cell 36 is in an advantageous treatment system which improves the overall health of the water over the use of a combination of other filtering systems which may incorporate the electrolytic cell 36. The combination may also have other benefits in improving the overall quality of the water besides the reduced ORP and addition of oxygen.

The electronic controls operate the power to the cell 18 in three modes. When the actuator switch 23 is first depressed, the electronic controls 34 enter a first mode of operation. During the first mode of operation, power is provided to the cell for a selected period of time regardless of whether the actuator switch 23 is released or pressed again. Once the actuator switch 23 is depressed, enabling the electronic controls, the current flows through the plates 76 for a minimum selected amount of time. In one embodiment, the selected amount of time for current flow is sixty seconds, though could be some other value, such as forty-five seconds, or the like. Once triggered, the current continues to run through the cell for the selected period of time even if the actuator switch 23 is released and the water valve is shut so water is not flowing out of tap 20. Thus, the water inside the electrolytic cell continues to be treated and is charged up with additional oxygen and electrons as has been described. For example, a user may normally depress the actuator switch 23 for thirty seconds to fill a glass of water, which may take fifteen to twenty seconds after which they will release the switch 23. The water flow stops, however, the electrolytic plates 67 continue to have power provided thereto for a full sixty seconds so as to pre-charge the water and fill chamber 73 with treated water for the next use. In one embodiment of the invention, the sixty second turn off delay is in addition to the time the tap is depressed, up to 2 minutes 45 seconds.

If the actuator switch 23 remains pressed beyond the selected period of time, the electronic circuit 34 enters the second mode of operation. During the second mode of operation, the on-time for power provided to the plates 76 tracks exactly the position of the actuator switch 23. The power on/off is linked to the actuator switch 23 to be controlled by the position of the switch. Namely, so long as the actuator switch 23 is depressed, power continues to be provided to the plates 76. When the actuator switch 23 is released, then power terminates to the plates 76 and the current terminates passing through the water. The second mode of operation is used if the switch is depressed for more than a selected period of time and released prior to the expiration of a third, extended time period.

If the switch 23 is depressed beyond the selected time period, the circuit enters a third mode of operation. The length of the extended time period is based on the capacity of the water tank 44. The extended time period approximately equals the amount of time to remove all water from a full tank 44. Thus, if three minutes is required to remove all the water from the tank 44, then the extended time period would be for three minutes. If the actuator switch 23 remains depressed continuously for three minutes with the valve open, then all water would have exited from the tank 44 based on its size and the circuits enters the third mode of operation. According to one embodiment in which the tank 44 is in the range of 1½–2 gallons, a maximum time period for the time to start the third mode is two minutes and forty-five seconds. Thus, at the expiration of two minutes and forty-five seconds the tank 44 will be expected to have been filly drained so that no more water is available for the use out of tap 20.

At the end of the extended time period, the electrical controls 34 enter a third mode of operation, that of automatic shut off. Once the extended time period has terminated, the electronic controls automatically shut off the current to the electrolytic cell. If the actuator switch 23 remains in the open position, a default circuit within the electronic controls 34 will automatically shut the current off to the cell to ensure that the plates do not burn up because no water is passing through the cells. Presumably, after a period of time the user will release actuator switch 23 so that it is no longer depressed, thus releasing the electrical circuit 34 from the third mode of operation in which the default is to automatically shut the current off.

In the event the actuator switch remains depressed for an excessive period of time, such as ten minutes, a fault light 71 will illuminate on the circuit board to alert the user that the actuator switch 23 appears to be stuck in the on position and corrective measures need to be taken. Once the actuator switch is closed, in any mode of operation, the system will reset itself automatically to start at the first mode and the electrolytic cell 36 will be available to perform another treatment sequence.

As will be appreciated, the length of time for each of the modes of operation, first mode, second mode and third mode, will be selected based on the design of each particular system. The first mode of operation is desired to be a length of time somewhat beyond that which the user would normally be expected in removing water from tap 20 to fill a glass or small pitcher. The length of time for the second mode of operation will be based on the time required to empty the tank 44 if it is completely full. According to one embodiment, there is a first mode and a third mode, but no second mode of operation in this embodiment. The electronic controls operate under the parameters of the first mode until the parameters of the third mode are met. The length of time for the third mode of operation, automatic shut off, will be based on the amount of time that is desired to give a user to make sure actuator switch 23 is not stuck and to release the valve so the tank 44 may once again begin to fill with water.

The water flow out of tank 44 is preferably at a relatively steady flow rate, under a known, constant pressure. The amount of current provided to the electric plates 76 is a preset current which is established by the electronic circuit 34 and does not change as water flows through the electrolytic cell 36. Since the water is flowing out of the tank 44 at a known, set rate, then the current can be set to a selected value to provide a known oxygenization of the water for the given flow rate at the direct current values as provided. Thus, it is not necessary to vary the amount of current provided to the plate 76 over one cycle, or from one cycle to the next, as is done in many other systems.

The electronic controls 34 contain the appropriate timers, power transistors and on/off switches to provide power to the system in a manner as described herein. For example, according to one embodiment, a timing circuit is provided on the printed circuit board 60 within the electronic controls 34 which operates as follows. The electronics on the circuit board 60 include standard timer circuits, switches and controls as would be available to those of skill in the art. For example, the timer circuit may be a simple 555 timer, available as an off-the-shelf electronic component. Power transistors may be provided which are switched via line 32 to carry a high current to the plates 76. Since the electronic controls are quite simple, a microprocessor need not be used but merely a 555 timer, together with some integrated memory having the software with three modes of operation stored therein and coupled to the appropriate timer and switch circuits. Thus, the electronic controls 34 can be relatively simple and low cost. Alternatively, if desired, a more complicated electronic controller can be used which may include a microprocessor to provide a more sophisticated software control system with the appropriate timer and switches enclosed within such microprocessor.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A treatment system for processing water, comprising:
   a first filter having an inlet and an outlet, the inlet of the first carbon filter being configured to fluidly communicate with a source of the water;
   an osmotic membrane contained within a first housing having an inlet and an outlet, the inlet of the first housing being in fluid communication with the outlet of the first filter;
   an electrolytic cell contained within a second housing having an inlet and an outlet, the inlet of the second housing being in fluid communication with the outlet of the first housing;
   a tap having an inlet, an outlet and an actuator, the inlet of the tap in fluid communication with the outlet of the second housing, the actuator of the tap being configured to open a valve to dispense via the tap; and
   an electronic control circuit coupled to the actuator to activate the electrolytic cell when water is dispensed.

2. The system of claim 1, further comprising a second filter having an inlet and an outlet, the inlet of the second filter being in fluid communication with the outlet of the second housing for a final treatment stage to the water.

3. The system of claim 1, further comprising a tank between the osmotic membrane and the tap such that the water is stored in the system after a reverse osmotic process.

4. The system of claim 1, further comprising a tank between the osmotic membrane and the tap such that the water is stored in the system after a reverse osmotic process, and wherein the control circuit is configured to stop a flow of water when the tank is empty.

5. The system of claim 1, further comprising a tank between the osmotic membrane and the tap such that the water is stored in the system after a reverse osmotic process, and wherein the control circuit is configured to stop a flow of water following a depletion duration after the tap is retained open, the depletion duration corresponding to the amount of time it takes for the tank to be emptied from completely full.

6. The system of claim 5 wherein the depletion duration is approximately 2 minutes and 45 seconds.

7. The system of claim 1, further comprising a tank between the osmotic membrane and the tap such that the water is stored in the system after a reverse osmotic process, and wherein the control circuit is configured to stop a flow of water following a first duration after the tap is retained open, the first duration corresponding to the amount of time it takes for the tank to be emptied from completely full, the control circuit further configured to trigger an alarm following a second duration greater than the first duration.

8. The system of claim 1 wherein each of the elements are sufficiently small to be collectively placed beneath a residential sink.

9. The system of claim 1 wherein each of the elements are sufficiently small to be collectively placed beneath a residential sink, and wherein the source of water is a residential utility line.

10. The system of claim 1 wherein the second housing is elongated having a first end and a second end, the electrolytic cell being positioned within the first end of the second housing, the second end of the second housing containing a dissolving chamber.

11. The system of claim 1 wherein the second housing is elongated having a bottom end and a top end, the inlet of the second housing being proximate to the bottom end, the electrolytic cell being positioned within the bottom end, the second end of the second housing containing a void, and the outlet of the second housing being proximate the top end such that water flowing through the second housing passes sequentially through the inlet, the electrolytic cell, the chamber and the outlet.

12. The system of claim 1 wherein the second housing has a cross-sectional shape, the electrolytic cell being closely conformed to the cross-sectional shape of the second housing such that water passing through the second housing passes in close relation to the electrolytic cell.

13. A method for processing water, comprising:

drawing water from a source of water at a know rate and passing the water drawn through a first filter for removing sediment, organic compounds, and other pollutants;

providing a reverse osmosis process to the water that has been drawn from the first filter by means of an osmotic membrane contained within a first housing having an inlet and an outlet, the inlet of the first housing being in fluid communication with an outlet of the first filter;

passing the water recently treated through an electrolytic cell contained within a second housing having an inlet and an outlet, the inlet of the second housing being in fluid communication with the outlet of the first housing, in order to add oxygen to the water, as well as improving the taste and affinity of the water for accepting other minerals; and, dispensing the treated water when a user wishes to drink the water.

14. The method of claim 13, further including:

passing the water that has been treated in the electrolytic cell through a second filter for a final treatment stage.

15. The method of claim 13, further including:

activating the electrolytic cell each time that water is being dispensed.

16. The method of claim 13, further including:

providing power to an electrolytic cell using an electronic control system comprising:

operating the cell in a first mode during which power is provided to a plurality of plates for a selected time period after the enable signal has been received from an on/off switch;

operating the cell in a second mode during which power is provided to the plates under the control of the on/off switch, the system entering the second mode of operation if the on/off switch remains depressed for beyond the selected time period; and operating the cell in a third mode during which power is terminated to the plates even if the on/off switch remains in the on position after the termination of an extended time period.

17. The method of claim 13 wherein the selected time period is the range of 45 to 60 seconds.

18. The method of claim 13 further including:

drawing water from a tank at a known rate and passing it through the electrolytic cell and wherein the extended time period is based on the amount time required to draw all the water from the tank.

* * * * *